United States Patent
Hedvik et al.

(10) Patent No.: US 10,428,746 B2
(45) Date of Patent: Oct. 1, 2019

(54) METHOD OF CONTROLLING AN OPERATION OF AN INLET VALVE SYSTEM AND AN INLET VALVE CONTROL SYSTEM

(71) Applicant: Wärtsilä Finland Oy, Vaasa (FI)

(72) Inventors: Sören Hedvik, Vaasa (FI); Magnus Sundsten, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 0 days.

(21) Appl. No.: 15/532,237

(22) PCT Filed: Dec. 8, 2014

(86) PCT No.: PCT/FI2014/050960
§ 371 (c)(1),
(2) Date: Jun. 1, 2017

(87) PCT Pub. No.: WO2016/092141
PCT Pub. Date: Jun. 16, 2016

(65) Prior Publication Data
US 2017/0268434 A1    Sep. 21, 2017

(51) Int. Cl.
*F01L 1/34* (2006.01)
*F02D 13/02* (2006.01)
(Continued)

(52) U.S. Cl.
CPC ............. *F02D 13/02* (2013.01); *F01L 1/08* (2013.01); *F01L 1/146* (2013.01); *F01L 1/16* (2013.01);
(Continued)

(58) Field of Classification Search
CPC .. F01L 1/08; F01L 9/025; F02D 13/02; F02D 13/0234
(Continued)

(56) References Cited

U.S. PATENT DOCUMENTS

| 2,670,595 A | 3/1954 | Miller |
| 7,395,668 B2 | 7/2008 | Gobert et al. |

(Continued)

FOREIGN PATENT DOCUMENTS

| DE | 102005048346 A1 | 4/2007 |
| EP | 0024944 A1 | 3/1981 |

(Continued)

OTHER PUBLICATIONS

Patent Cooperation Treaty, Notification of Transmittal of the International Search Report and the Written Opinion of the International Searching Authority for PCT/FI2014/050960 dated Sep. 8, 2015, 11 pages.

*Primary Examiner* — Ching Chang
(74) *Attorney, Agent, or Firm* — Heslin Rothenberg Farley & Mesiti P.C.; Victor A. Cardona, Esq.

(57) ABSTRACT

A method of controlling an operation of an inlet valve system arranged in connection with each cylinder of an internal combustion piston engine, includes monitoring at least one parameter relating to engine load conditions, controlling using a primary control procedure an opening and closing timing of an inlet valve in response to the at least one parameter, and feeding charge air into the cylinder when the inlet valve is open. In a secondary control procedure a parameter relating to engine load conditions is measured and the closing timing of the inlet valve of the inlet valve system is controlled in response to the at least parameter independently from and with higher priority than the primary control procedure.

22 Claims, 4 Drawing Sheets

(51) Int. Cl.
*F01L 1/14* (2006.01)
*F01L 1/16* (2006.01)
*F01L 1/26* (2006.01)
*F01L 1/08* (2006.01)
*F01L 9/02* (2006.01)
*F01L 13/00* (2006.01)

(52) U.S. Cl.
CPC ................ *F01L 1/26* (2013.01); *F01L 9/025* (2013.01); *F01L 2013/0089* (2013.01); *F01L 2820/01* (2013.01); *F02D 13/0234* (2013.01)

(58) Field of Classification Search
USPC ........................................... 123/90.15, 90.17
See application file for complete search history.

(56) References Cited

U.S. PATENT DOCUMENTS

| 8,375,904 B2 * | 2/2013 | Gustafson | F01L 1/08 |
| | | | 123/90.15 |
| 2002/0026912 A1 | 3/2002 | Ariga | |
| 2003/0221644 A1 | 12/2003 | Barnes et al. | |

FOREIGN PATENT DOCUMENTS

| EP | 2048331 A2 | 4/2009 |
| WO | 2011135162 A1 | 11/2011 |
| WO | 2014060645 A1 | 4/2014 |
| WO | 2014126737 A1 | 8/2014 |

* cited by examiner

METHOD OF CONTROLLING AN OPERATION OF AN INLET VALVE SYSTEM AND AN INLET VALVE CONTROL SYSTEM

CROSS REFERENCE TO RELATED APPLICATIONS

This application is a National Stage filing under section 371 of International Application No. PCT/FI2014/050960, filed on Dec. 8, 2014, and published on Jun. 16, 2016, as WO 2016/092141 A1. The entire disclosure of the prior application is hereby incorporated herein by reference.

TECHNICAL FIELD

The present invention relates to a method of controlling an operation of an inlet valve system according to the preamble of claim 1.

The present invention relates also to an inlet valve control system according to the preamble the independent apparatus claim.

BACKGROUND ART

The operational requirements of combustion engines are becoming more and more demanding. Exhaust gas emission requirements of internal combustion piston engines become more and more stringent. In order to cope with such requirements there are various techniques available by means of which the gaseous emissions may be controlled when the engine is running. The timing of the inlet valves plays significant role in the engine performance. Particularly, it has an effect of temperature and pressure prevailing in the cylinder and thus a formation of gaseous pollutants such as NOx emissions.

U.S. Pat. No. 2,670,595 discloses a so-called Miller cycle wherein the inlet valve is closed before the piston reaches the bottom dead center of the intake stroke. After closing of the inlet valve, the charge, or air, in the cylinder expands resulting in decreasing the pressure and the temperature or the charge.

U.S. Pat. No. 7,395,668 B2 discloses a turbo-charged diesel-type piston engine and method for controlling such an engine which the thermal efficiency of the internal combustion engine can be increased while the requirements relating to nitrogen oxide and soot particle emissions continue to be maintained.

WO 2014/126737 A1 discloses a control system of a gaseous fuelled engine with a cam phaser for improving the engine start. The control system may have variable inlet valve timing device configured to adjust a cyclical closing timing of the inlet valve. A controller may be configured to selectively initiate a first Miller cycle timing and a second Miller cycle timing.

WO 2011/135162 A1 discloses a control arrangement for a gas exchange valve in a piston engine adapted between the camshaft of the engine and the valve mechanism. The control arrangement comprises a chamber that is in connection with a hydraulic medium and in which a piston is movably arranged to be in mechanical force transmission connection with the camshaft and the valve mechanism at least for opening the valve.

In a case of a malfunction in operation of the inlet valve system, particularly controlling the closing timing of the inlet valve, pressure in the cylinder may increase significantly which has undesirable consequences. In some cases that may even damage the inlet valve system and parts in connection with the cylinder.

An object of the invention is to provide a method of controlling an operation of an inlet valve system, and an inlet valve control system in which the performance is considerably improved compared to the prior art solutions.

DISCLOSURE OF THE INVENTION

Object of the invention is substantially met by a method of controlling an operation of an inlet valve system arranged in connection with each cylinder of an internal combustion piston engine, which method comprises during the operation of the engine steps of 1) Monitoring at least one parameter relating to engine load conditions,
2) Controlling, using a primary control procedure, a closing timing of an inlet valve of the inlet valve system in response to the at least one parameter obtained in the step 1), and
3) Feeding charge air into the said cylinder via the inlet valve of the inlet valve system when the inlet valve is open.

It is characteristic to the invention that using a secondary control procedure the closing timing of the inlet valve of the inlet valve system is controlled in response to at least one parameter relating to engine load conditions independently from and with higher priority than by using the primary control procedure.

The variation of inlet valve closing timing is achieved e.g. through the addition of a hydraulic chamber between the inlet valve tappet and the push rod. Adjustability of the inlet valve movement is achieved by controlling the oil flow into and out the hydraulic chamber.

This provides a method for controlling an operation of an inlet valve system which performance is considerably improved. This is particularly useful to control pressure levels to be at an adequate level in the cylinder of the engine. Namely, if the pressure increases too much in the cylinder it may have undesired consequences. The secondary control procedure may take place in case of malfunction of the primary control procedure where the primary control procedure is delayed or inhibited to close the inlet valve. Then the secondary control procedure overrides the primary control procedure by independently closing the inlet valve and preventing thus the pressure to increase over an adequate level in the cylinder. In other words, the secondary control procedure prevents the inlet valve to close too late.

According to an embodiment of the invention in the secondary control procedure the at least one parameter is the pressure of the charge air. Preferably the charge air is pressurized by at least two turbochargers and the pressure or the charge air is the pressure after the turbochargers.

According to an embodiment of the invention in the secondary control procedure the at least one parameter is a temperature of the charge air.

According to an embodiment of the invention the at least one parameter for the primary control procedure and for the secondary control procedure are acquired independently from each other.

According to an embodiment of the invention the at least one parameter for the primary control procedure and the at least one parameter for the secondary control procedure are different parameters.

According to an embodiment of the invention the at least one parameter for the primary control procedure and for the secondary control procedure is the same parameter.

According to an embodiment of the invention charge air is fed to the engine pressurized in two super-charging stages and is fed into the cylinder at a pressure higher than 5 bar.

According to an embodiment of the invention the secondary control procedure closes the inlet valve overruling the primary control procedure at latest at a crank angle which result in compression pressure lower than a predetermined maximum compression pressure prior to ignition.

According to an embodiment of the invention the secondary control procedure closes the inlet valve by mechanically effecting on the valve actuation system.

According to an embodiment of the invention the secondary control procedure closes the inlet valve by hydraulically effecting on the valve actuation system.

According to an embodiment of the invention the charge air is pressurized in two super-charging stages to a pressure of higher than 5 bars, and the primary control procedure is arranged to close the inlet valve during the operation of the engine within a first range having a first i.e. upper crank angle value in respect to the bottom dead center, and a second i.e. lower crank angle value in respect to the bottom dead center. Additionally the secondary control procedure is practiced parallel with and independently on the primary control procedure, which secondary procedure closes the inlet valve at a third crank angle in respect to the bottom dead center, which third crank angle is equal to or less than the second crank angle value.

According to an embodiment of the invention the primary control procedure closes the inlet valve within a first range between a first crank angle value and a second crank angle value in respect to the bottom dead center and the secondary procedure closes the inlet valve within a second range between a third crank angle and a fourth crank angle in respect to the bottom dead center. The third crank angle is outside the first range and closer to the bottom dead center than the top dead center. As an example the first range at which the primary control procedure closes the inlet valve is advantageous 70-100 degrees before the bottom dead center, and the third crank angle is advantageously 55-70 degrees before the bottom dead center.

In other words the second control procedure is arranged to close the inlet valve independently at an angle outside, and closer to the bottom dead center than, the range which the primary control procedure is arranged to close the inlet valve during nominal load of the engine.

According to an embodiment of the invention the primary control procedure and secondary control procedure are used for control a common mechanical actuator.

According to another embodiment of the invention the primary control procedure and secondary control procedure are used for control a mechanical actuator dedicated to the each of the primary control procedure and secondary control procedure.

Object of the invention is also met by an inlet valve control system for use in connection with a cylinder of an internal combustion piston engine, the inlet valve control system comprising a monitoring unit arranged to monitor at least one parameter relating to engine load conditions, a primary control unit arranged to control closing timing of an inlet valve of the inlet valve system in response to at least one parameter relating to engine load conditions. It is characteristic to the invention that the inlet valve control system comprises a secondary control unit arranged to control the closing timing of the inlet valve in response to at least one parameter relating to engine load conditions independently from and with higher priority than the primary control unit.

According to an embodiment of the invention the secondary control unit is arranged to control the closing timing of the inlet valve in response to measured pressure of the charge air.

According to an embodiment of the invention the secondary control unit is arranged to control the closing timing of the inlet valve in response to measured temperature of the charge air.

According to an embodiment of the invention the secondary control unit is arranged to control the closing timing of the inlet valve by actuating a mechanical valve closing system.

According to an embodiment of the invention the secondary control unit is arranged to control the closing timing of the inlet valve by actuating a mechanical valve closing system.

According to an embodiment of the invention the primary control unit is provided with computer executable instructions to control closing timing of an inlet valve of the inlet valve system in response to at least one parameter relating to engine load conditions, and that the secondary control unit is provided with computer executable instructions to close the inlet valve in response to at least one parameter relating to engine load conditions independently from and with higher priority than the primary control unit.

According to an embodiment of the invention the primary control unit is arranged to close the inlet valve within a first range having a first i.e. upper crank angle value in respect to the bottom dead center, and a second i.e. lower crank angle value in respect to the bottom dead center, and the secondary control unit is arranged to close the inlet valve within a second range between a third crank angle and fourth angle in respect to the bottom dead center, which third crank angle is outside, and closer to the bottom dead center than, the first range.

According to an embodiment of the invention the primary control unit is arranged to close the inlet valve within a range of 70-100 degrees before the bottom dead center.

According to an embodiment of the invention the primary control unit is arranged to close the inlet valve within a range of 70-100 degrees before the bottom dead center, and the secondary control unit is arranged to close the inlet valve arranged to close the inlet valve within a range of 55-70 degrees before the bottom dead center.

According to an embodiment of the invention, the method comprises steps of using the secondary control procedure wherein parameter relating to engine load conditions is a charge air pressure that is measured and the closing timing of the inlet valve of the inlet valve system is controlled in response to the charge air pressure independently from and with higher priority than the primary control procedure.

According to an embodiment of the invention, the secondary control unit is arranged directly in connection with each of the inlet valve of the each cylinder.

According to an embodiment of the invention, the primary control unit and the secondary control unit are integrated into a common physical system.

According to an embodiment of the invention the primary and the secondary control units are totally independent from each other. In practice, this means that in the engine all or some of the mechanical and/or electrical and/or software components are at least duplicated.

According to an embodiment of the invention the primary control unit is provided with computer executable instructions to control opening and closing timing of an inlet valve of the inlet valve system in response to at least one parameter relating to engine load conditions, and the secondary control unit is provided with computer executable instructions to close the inlet valve in response to at least one parameter relating to engine load conditions independently from and with higher priority than the primary control unit.

According to an embodiment of the invention the primary control unit and the secondary control unit are arranged to control a mechanical actuator dedicated to each of the control units.

According to an embodiment of the invention the primary control unit and the secondary control unit are arranged to control a common mechanical actuator.

BRIEF DESCRIPTION OF DRAWINGS

In the following, the invention will be described with reference to the accompanying exemplary, schematic drawings, in which.

DETAILED DESCRIPTION OF DRAWINGS

Figure 1:
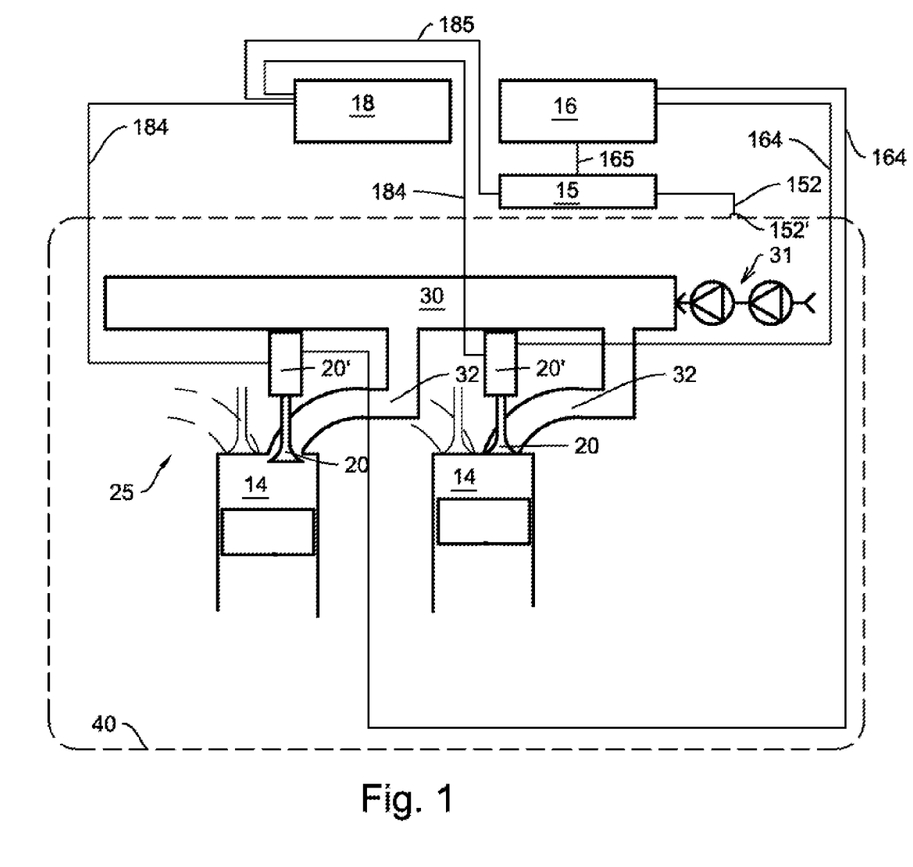
FIG. 1 illustrates an inlet valve control system according to an embodiment of the invention.

FIG. 1 depicts schematically an inlet valve control system 10 for use in connection with an internal combustion piston engine 40. The inlet valve control system 10 is arranged in connection with each cylinder 14 of an internal combustion piston engine 40 to control the operation thereof. The engine 40 is provided with an inlet valve system 25 and an outlet valve system of the engine 40. In connection with the inlet valve system 25 there is a valve actuation system 20' for moving the valve stem in synchronized manner with the power parts of the engine, particularly the piston.

The inlet valve control system 10 according to an embodiment of the invention comprises a monitoring unit 15 arranged to monitor at least one parameter relating to engine load conditions. A parameter relating to engine load may be selected according to a specific application and it is possible use simultaneously several different parameters for determine a parameter relating to the load. For example, in turbo charged engine the charge air pressure may be used a parameter relating to the load. Also, a flow rate of fuel, cylinder peak pressure, compression pressure, and/or calculated lambda may be used as parameter relating to the load. There is a communication system 152 provided in the control system 10 via which the monitoring unit 15 may receive the information of the parameter. There is at least one sensor 152' arranged in connection with the engine 40 and in connection with the monitoring unit 15 via the communication system 152 so as to detect the engine load conditions and to generate a signal to be detected and processed by the monitoring unit 15. In case the engine is in connected to generator of electric power the at least one sensor 152' may be arranged in connection with the generator, in which case the electric power demand may be used as the parameter relating to engine load conditions. The valve control system 10 comprises further a primary control unit 16. The monitoring unit 15 and the control unit 16 may be separate units or they may be integrated with each other or be a part of a general control system of the engine or generator set. The monitoring unit 15 is arranged in connection with the primary control unit 16 via a communication system 165. So, during the operation of the engine at least one parameter relating to the engine load conditions is monitored. The primary control unit 16 is arranged to control closing (?) timing of an inlet valve 20. Particularly the primary control unit 16 is arranged to control closing timing of an inlet valve 20 of an inlet valve system 25 in response to at least one parameter relating to monitored engine load conditions. The primary control unit 16 is controlling the operation inlet valves 20 during normal operation of the engine. When the engine is running, the charge air is fed into the cylinder 14 via the inlet valve when the inlet valve is open. According to an embodiment of the invention the charge air is pressurized in a supercharger 31 applying two supercharging stages, wherein the charge pressure is higher than 5 bars.

Closing timing i.e. the crank angle at which the inlet valve is closed has a strong effect on the gas pressure prevailing in the combustion chamber after the compression stage performed by the piston, particularly when applying two supercharging stages. The primary control unit 16 is provided with executable instructions to control closing timing of the inlet valves 20. The primary control unit may be a computer adapted to run the executable instructions to provide the desired effect on the operation of the inlet valve. The operation of the inlet valve may be partially effected by hydraulic medium such that an effective volume of the hydraulic medium effects on the effective length of valve lifting coupling between a cam surface of a cam shaft and the valve stem (not shown). According to an embodiment of the invention, a parameter relating to engine load conditions is the actual engine load.

Specifically, the communication systems form an information transfer means between the entities in the system, such as the monitoring unit 15 to the primary control unit 16. The primary control unit 16 is arranged to control or adjust the closing timing of the inlet valve 20 in response to a signal transferred from the monitoring unit 15 to the primary control unit 16. During monitoring the at least one parameter relating to the engine load conditions, also a comparison with the monitored parameter or parameters and a set parameter or parameters are carried out so as to detect differences in operation and potential undesirable circumstances or even malfunctions. Controlling the inlet valve 20 of the inlet valve system 10 is performed by the primary control unit 16 via a communication system 164 from the primary control unit 16 to the inlet valve 20. A combustion air feeding system 30 is arranged to feed compressed charge air into a cylinders 14 via the conduit 32 when the respective inlet valve 20 is open. In FIG. 1, the inlet valve 20 on the left hand side is open and the inlet valve 20 on the right hand side is closed. The closing timing of the inlet valve 20 is adjustable and it is possible to provide stopping of the combustion air flow from the combustion air feeding system 30 into the cylinder 14 later or earlier than normally e.g. in different load conditions of the engine. Such operation refers to a so-called Miller-cycle. Retarding or advancing time or timing of closing of the inlet valve 20 is advantageously predetermined or pre-set based on various operational parameters of the engine and stored in or made available to the primary control unit 16.

The inlet valve control system 10 comprises also a secondary control unit 18. The secondary control unit 18 is arranged to control closing timing of the inlet valve 20 of the inlet valve system 10 in response to at least one parameter relating to engine load conditions independently from and with higher priority than the primary control unit 16. So, using a secondary control procedure 18 the closing timing of the inlet valve 20 of the inlet valve system 10 is controlled in response to at least one parameter relating to engine load conditions independently from and with higher priority than the primary control procedure 16. In practical circumstances this means that independently from the operation of the primary control unit 16 the secondary control unit makes sure that the inlet valve is closed at latest at such crank angle that the final compression pressure is at desired level, taking into account the expansion when the valve is closed before the bottom dead center BDC and the compression after BDC. Particularly when the engine is provided with two stage supercharger 31, by means of the present invention it is possible to make sure that any malfunction is the primary control unit 16, or in generally, in the primary control system, does not cause damage to the engine. If the inlet valve would be closed at too late stage, when the charging with two stage supercharger, the compression pressure would rise at too high level.

A communication system 185 depicts an information transfer from the monitoring unit 15 to the secondary control unit 18. In response of a signal transferred from the monitoring unit 15 to secondary control unit 18, the secondary control unit adjusts the closing timing of the inlet valve 20 of the inlet valve system 10.

It should be noted that monitoring can be referred also to measuring and/or determining based on measurements and therefore monitoring unit or units in this context should be understood also as measuring and/or determination unit or units.

In the second control unit, independently from the operation of the first control unit, during monitoring the at least one parameter relating to the engine load conditions, also a comparison with the monitored parameter or parameters and a set parameter or parameters are carried out. If there are differences between the monitored value or values and the set value or values, and the difference is outside a predetermined acceptable range, the secondary control unit 18 is prioritized over the first control unit 16 and it takes over the control of the inlet valve 20 making the control of the first control unit ignored in the operation. According to an advantageous embodiment the second control unit 18 adjusts the closing position of the inlet valves 20 so as to operate the engine at a desirable manner. This way, also in case of undesirable operation of the primary control unit 16, for any reason, an adequate pressure level in the cylinder after the compression stage is achieved under control of the secondary control unit 18. Particularly, in case of malfunction of the primary control unit 16 or when an operation of the primary control unit 16 is inhibited or delayed to control the closing timing of the inlet valve 20 of the inlet valve system 10 with respect to the at least one parameter relating to the engine load conditions, the secondary control unit 18 adjusts the closing timing of the inlet valve 20 in response to the at least parameter relating to the engine load conditions thus providing an adequate pressure level in the cylinder 14 after the compression stage. In other words, the secondary control unit 18 overrides the primary control unit 16 and controls the closing timing of the inlet valves 20 in case of malfunction. Thus, with a secondary unit the closing timing of the inlet valve is controlled independently from and with higher priority than the primary control procedure. Therefore, in a case of malfunction or in a case of emergency, the secondary control unit 18 can act as a safety control unit.

As particular embodiment the parameter is the pressure of the charge air and secondary control unit 18 is provided with information of correlation between charge air pressure value and a suitable closing timing of the inlet valve the charge air pressure. The correlation may be a function or a table of distinct pairs or values. Now, according to the invention in addition to the normal operation of the primary control unit 16, the secondary control unit 18 is operated independently from the primary control unit 16. And, should the secondary control unit be activated i.e. the pressure of the charge air exceeds a certain level the secondary control unit 18 overrides the primary control unit 16 and closes the inlet valve 20. The second control unit is activated independently from the primary control unit 16. It may be said that the secondary unit proactively limits the operating window of the inlet valve.

Thus, by means of the secondary control unit 18 it is possible to ensure that the pressure in the combustion chamber after the compression stage does not rise too high, above a predetermined pressure level. The predetermined pressure level can be decided in advance and so prevent any undesirable effect or damage to occur in the engine. According to an embodiment of the invention the inlet valves 20 are controllable cylinder-wise via communication systems 164 and 184. The inlet valves 20 can be of any types of known inlet valves provided with actuation system with adjustable closing timing operation.

It should be noted that the target control values of the primary and secondary control units are so set that in normal operations when the engine 40 is running the secondary control unit 18 does not have an effect on the closing timing of the inlet valves 20. Hence, the closing of the inlet valves are controlled merely by the primary control unit 16. However, the secondary control unit 18 is operating in the background and ready to override the primary control unit 16 when the engine is running in a manner activating the secondary control unit.

According to an embodiment of the invention the primary and the secondary control units are totally independent from each other. In practice, this means that in the engine all or some of the mechanical and/or electrical and/or software components are at least duplicated.

Figure 2:
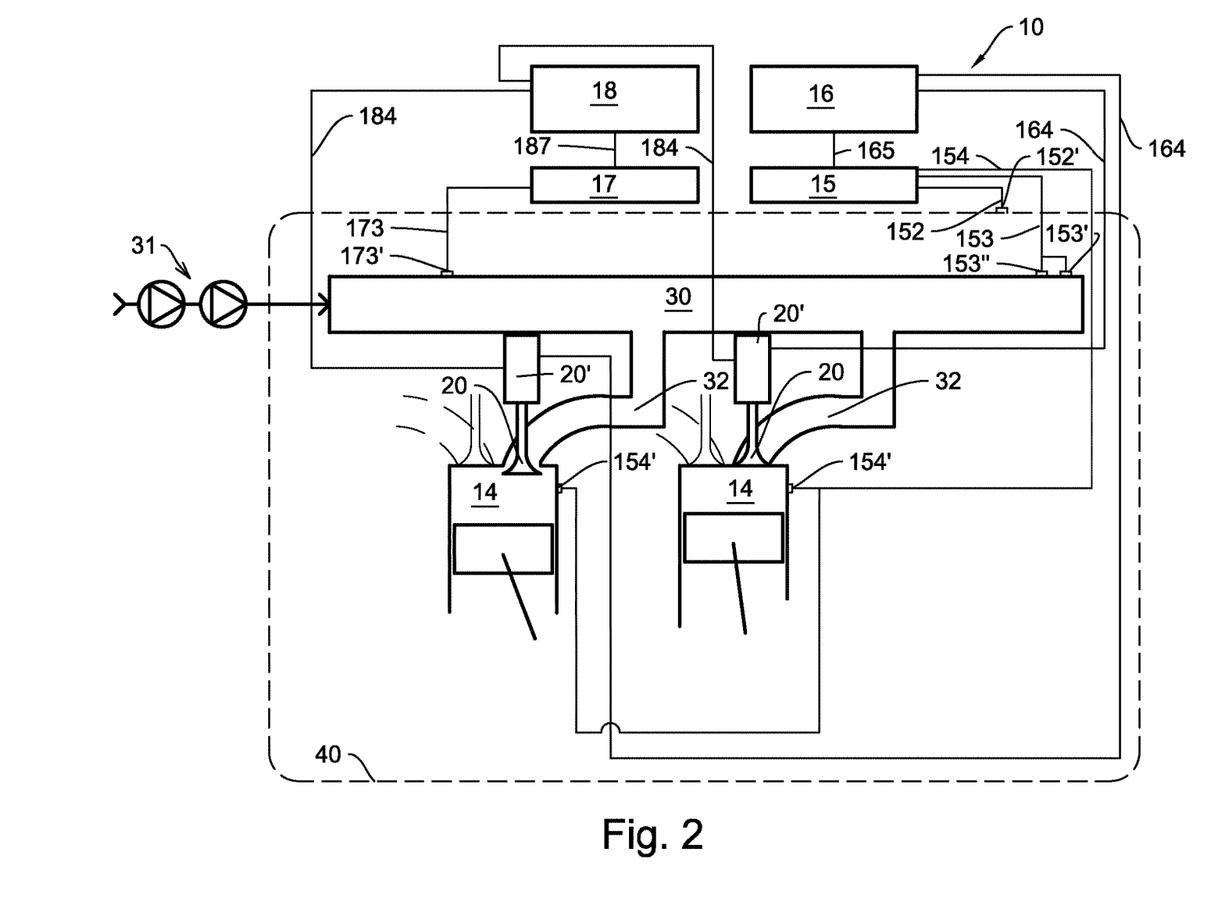
FIG. 2 illustrates an inlet valve control system according to another embodiment of the invention.

FIG. 2 illustrates an embodiment of the inlet valve control system 10. Similarly as in FIG. 1, the monitoring unit 15 is arranged to monitor the at least one parameter relating to engine load conditions such as engine load via the communication system 152. The communication system 152 can be provided with sensors 152' to detect information for determining the engine load conditions. The monitoring unit 15 is also arranged in connection with a pressure sensor 153' via a communication system 153 to monitor a charge air pressure prevailing in the combustion air feeding system 30. In the embodiment of the FIG. 2, in addition to being in connection with the pressure sensor, the monitoring unit 15 may also in connection with a charge air temperature sensor via the communication system 153. The communication system 153 can be provided with a pressure sensor 153' and a temperature sensor 153". The closing timing of the inlet valve 20 of the inlet valve system 10 is controlled by means of the primary control unit 16, in response to the at least one parameter relating to the engine loads such as charge air pressure, charge air temperature, engine load or engine speed. Furthermore, according to an embodiment of the invention the control system comprises a communication system 154 from the monitoring system 15 to cylinders 14, so that the monitoring system 15 is arranged to monitor also conditions prevailing in the cylinder, such as pressure or temperature. The communication system 154 can be provided with a sensor 154' to detect conditions prevailing in the cylinder such as a pressure sensor and/or temperature sensor.

According to an embodiment of the invention, the control system is provided with a second monitoring unit 17 arranged to monitor a parameter relating the load of the engine. Such a parameter may be measure or determined based on one or several values, such as charge air pressure, cylinder peak pressure, torque, compression pressure, and/or calculated lambda may be used for determining the parameter relating to the load. The second monitoring unit 17 is connected via a communication system 173 to suitable probes. In the FIG. 3 there is shown that the second monitoring unit 17 is connected to monitor a charge air pressure prevailing in the combustion air feeding system 30. Here, as an example, the communication system 173 is arranged with a pressure sensor 173' so as to detect the prevailing pressure in the combustion air feeding system 30. The second monitoring system is arranged as dedicated monitoring system for the secondary control unit 18, which is arranged to receive information from the second monitoring unit 17 via the conduit 187. Thus in response to the parameter, the secondary control unit 18 controls the closing timing of the inlet valve 20 of the inlet valve system 10 independently from the primary control unit 16 and the monitoring system 15. Even though, the monitoring unit 15 and the second monitoring unit 17 are shown as separate units, it is possible that they are integrated into a one monitoring unit. FIG. 2 shows particularly that the secondary unit 18 can control the closing timing of the inlet valve 20 of the inlet valve system 10 independently and with higher priority than a primary control procedure.

According to an advantageous embodiment of the invention, the second monitoring unit 17 is arranged to monitor charge air pressure prevailing in the combustion air feeding system 30. Thus parameter relating to engine load conditions is a charge air pressure that is measured and the closing timing of the inlet valve 20 of the inlet valve system 10 is controlled in response to the charge air pressure independently from and with higher priority than the primary control system.

It should be noted that the primary control unit 16, the secondary control unit 18 and the monitoring unit 15 can be arranged into a one physical system.

Figure 3:
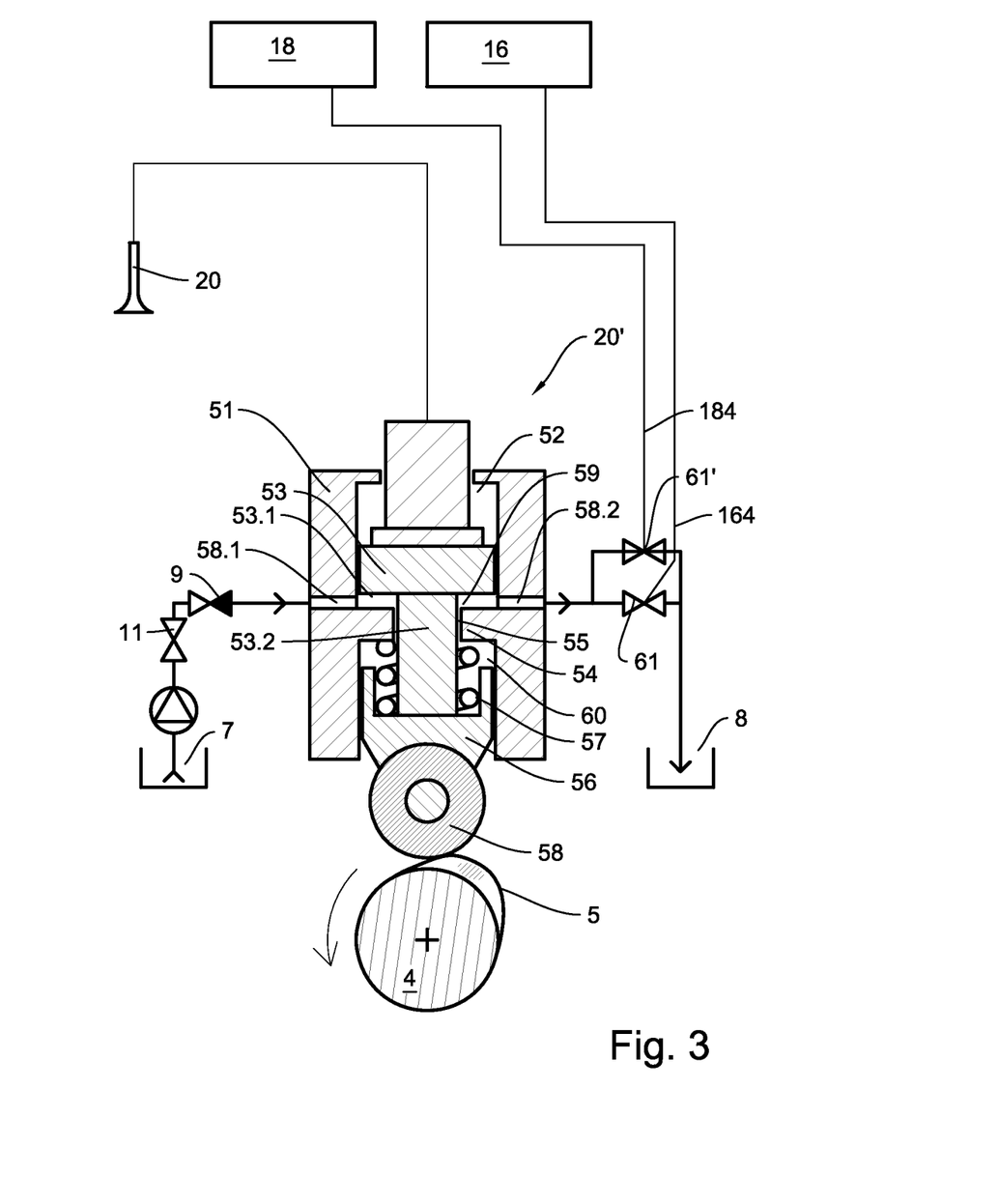
FIG. 3 illustrates an actuation system according to an embodiment of the invention.

In FIG. 3 there is shown an embodiment of the actuation system 20'. The actuation system 20' is shown in a state, whereby the valve 20 in connection therewith is partially opened by the cam profile 5. The actuation system 20' comprises a body part 51, which is typically attached to the engine body. The body part 51 is provided with a chamber 52, in which a piston device 53 is arranged on the first side to be movable in the direction of its longitudinal axis. The intermediate part of the chamber 52 is provided with a partition wall 54 with a cylindrical opening 55 arranged at the middle axis of the chamber. The piston device 53 comprises a first portion 53.1, the diameter of which corresponds to the diameter of the chamber 52, and a second portion 53.2, which corresponds to the diameter of the opening 55 in the partition wall being smaller than the diameter of the chamber 52. The second portion 53.2 of the piston device extends in the body part 51 through the opening 55 into the chamber 52 located on the other side of the partition wall. The thickness of the partition wall in the direction of the longitudinal axis of the piston device is dimensioned so as to operate as a guiding element for the second portion 53.2 of the piston device.

The partition wall 54, dividing the chamber 52, together with the first portion 53.1 of the piston device forms on the first side of the chamber 52 a first chamber space 59, the volume of which increases as the piston device 53 moves in the opening direction of the inlet valve 20, i.e. away from the camshaft 4. The partition wall 54 forms on the second side of the chamber 52 a second chamber space 60. On the other side of the partition wall 54 in the chamber 52 there is arranged a guide part 56 as well as a spring 57. In addition the guide part 56 is provided with a roller 58, which moves along the cam profile 5 while the camshaft 4 rotates. The spring 57 is adapted between the guide part 56 and the partition wall 54 to press the guide part 56 towards the camshaft 4 and to keep the roller 58 in contact with the cam profile 5 of the camshaft 4. On the first side of the chamber 52, in the vicinity of the partition wall 54, there is arranged a connection for hydraulic medium, comprising a feed conduit 58.1 and a discharge conduit 58.2, both opening to the chamber space 59. The feed conduit 58.1 is in connection with a source 7 of hydraulic medium, which in an engine may also be a normal forced lubrication system. The feed conduit 58.1 is provided with a shut-off valve 11 and a one-way valve 9. By means of the shut-off valve 11 the feed conduit 58.1 may be connected to the chamber space 59 or disconnected from it, depending on whether the aim is to use the actuation system 20' for the delayed closing of the inlet valve 20 or not. By adding hydraulic medium into the space 59 and control the timing of releasing the medium from the space it is possible to control the delayed closing timing of the inlet valve 20. Owing to the one-way valve 9 the control arrangement does not cause any pulsations in the source of hydraulic medium. This is of special importance when lubricating oil is used as a hydraulic medium. The discharge conduit 58.2 is in connection with a return system 8 for hydraulic medium, which at simplest may be arranged to open to the inner space of the engine, whereby the lubricating oil used as hydraulic medium is allowed to flow down to the oil sump of the engine. The discharge conduit 58.2 is provided with electronically controlled main valve means 61 for adjustably determining the exact time of the releasing of pressure in the chamber space 59. The electronically controlled main valve means 61 is responsive to a control signal 164 from a the primary control unit 16 arranged to adjust the closing of the gas exchange valve 20 to comply with the operating conditions of the engine in each case. There is also arranged a second valve means 61', parallel with the main valve means 61, which is arranged to operate under control of the secondary control unit 18 only. The second valve means 61' is arranged responsive to a control signal 184 from the secondary control unit 18. Thus the primary and the secondary control units are arranged to control a mechanical actuator dedicated to each of the control units, which in this embodiment are the valve means. This way the pressure in the chamber space 59 may be released even if the electronically controlled main valve 61 operating in normal conditions should fail. The main valve means 61 and the second valve means 61' are both fast acting valves. That is because the releasing of the pressure must be taken place at a rate at which the inlet valve is desired to be closed. Even if not shown in the FIG. 3 the primary control unit 16 and the secondary control unit 18 may be are arranged to control a common mechanical actuator, which in this embodiment means one valve means. Thus in such an embodiment both the 3 the primary control unit 16 and the secondary control unit 18 are connected with the communication systems 164 and 184 with only valve means 61, and in that case the second valve means 61' may be omitted.

Figure 4:
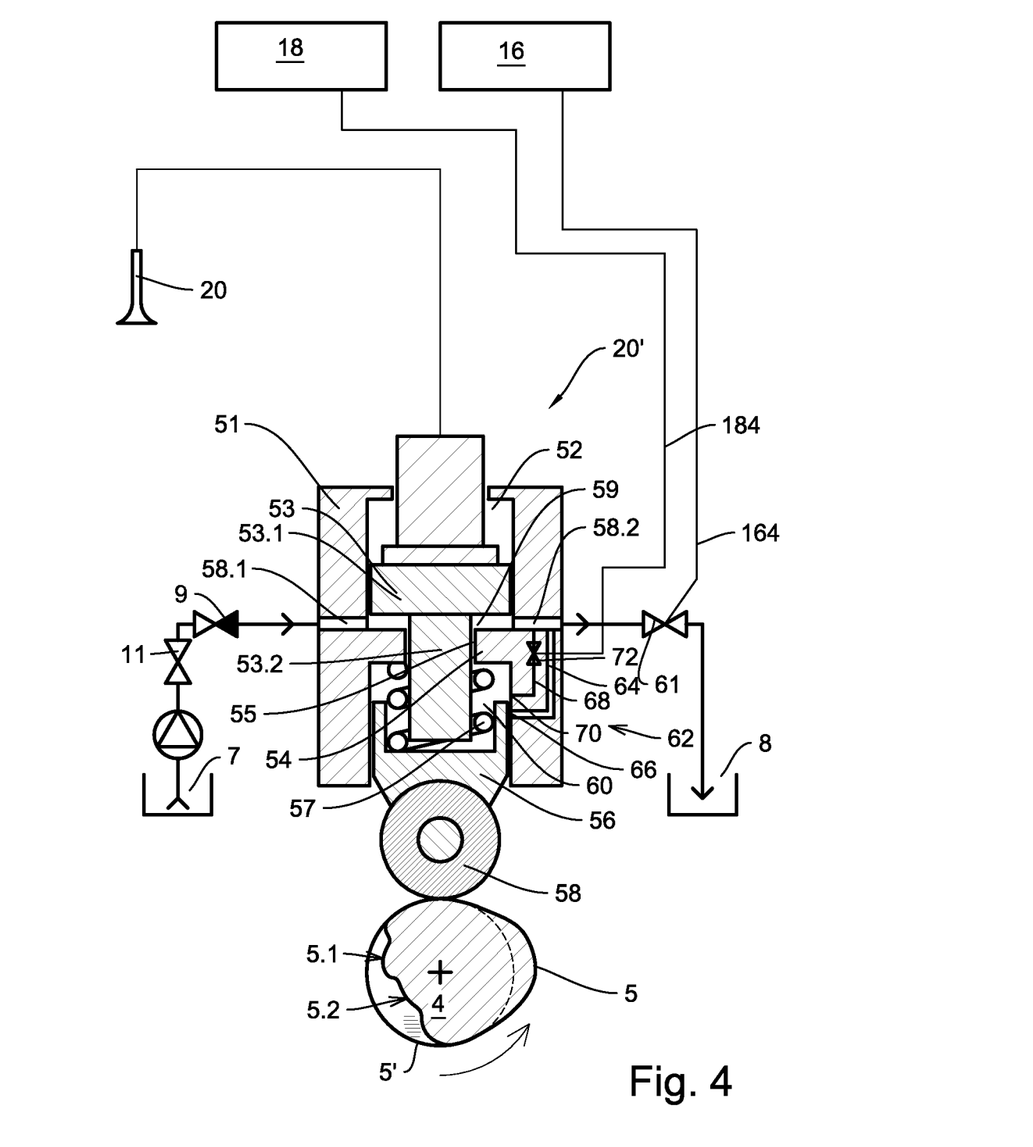
FIG. 4 illustrates an actuation system according to another embodiment of the invention.

In FIG. 4 there is shown a further embodiment of the actuation system 20' comprising a mechanical valve closing system. The actuation system is shown here in a state, where the inlet valve 20 in connection therewith is partially opened by means of hydraulic medium. The actuation system 20' comprises a body part 51, which is provided with a chamber 52, in which a piston device 53 is arranged to be movable in the direction of its longitudinal axis. The intermediate part of the chamber 52 is provided with a partition wall 54 with a cylindrical opening 55 arranged at the middle axis of the chamber. The piston device 53 comprises a first portion 53.1, the diameter of which corresponds to the diameter of the chamber 52, and a second portion 53.2, the diameter of which corresponds to the diameter of the opening 55 in the partition wall, being smaller than the diameter of the chamber 52. The second portion 53.2 of the piston device extends in the body part 51 through the opening 55 into the chamber 52 located on the other side of the partition wall. The thickness of the partition wall in the direction of the longitudinal axis of the piston device is dimensioned so as to operate as a guiding element for the second portion 53.2 of the piston device.

The partition wall 54, dividing the chamber 52, form together with the first portion 53.1 of the piston device on the first side of the chamber 52 a first chamber space 59, the volume of which increases as the piston device 53 moves in the opening direction of the inlet valve 20, i.e. away from the camshaft 4. The partition wall 54 forms on the second side of the chamber 52 a second chamber space 60. On the other side of the partition wall 54 in the chamber 52 there is arranged a guide part 56 as well as a spring 57. The guide part 56 is provided with a roller 58, which moves along the cam profile 5 while the camshaft 4 rotates. The spring 57 is adapted between the guide part 56 and the partition wall 54 to press the guide part 56 towards the camshaft 4 and to keep the roller 58 in contact with the cam profile 5 of the camshaft 4. On the first side of the chamber 52, in the vicinity of the partition wall 54, there is arranged a connection for hydraulic medium, comprising a feed conduit 58.1 and a discharge conduit 58.2, both opening to the chamber space 59. The feed conduit 58.1 is in connection with a source 7 of hydraulic medium, which in an engine may also be a normal forced lubrication system. The feed conduit 58.1 is provided with a shut-off valve 11 and a one-way valve 9. By means of the shut-off valve 11 the feed conduit 58.1 may be connected to the chamber space 59 or disconnected from it, depending on whether the aim is to use the actuation system 20' for the delayed closing of the inlet valve 20 or not. By adding hydraulic medium into the space 59 and control the timing of releasing the medium from the space it is possible to control the delayed closing timing of the inlet valve 20. Owing to the one-way valve 9 the actuation system 20' does not cause any pulsations in the source of hydraulic medium. This is of special importance when lubricating oil is used as a hydraulic medium. The discharge conduit 58.2 is in connection with a return system 8 for hydraulic medium, which at simplest may be arranged to open to the inner space of the engine, whereby the lubricating oil used as hydraulic medium is allowed to flow down to the oil sump of the engine. The discharge conduit 58.2 is provided with electronically controlled valve means 61 for adjustably determining the exact time of the releasing of pressure in the chamber space 59. The electronically controlled valve means 61 is responsive to a control signal 164 from a the primary control unit 16 arranged to adjust the closing of the gas exchange valve 20 to comply with the operating conditions of the engine in each case. In the embodiment of FIG. 4 the actuation system 20' comprises a mechanical arrangement 62 for ensuring the closing of the inlet valve independently from the operation of the electronically controlled valve means 61.

The actuation system 20' is provided with a first pressure release conduit 68. The first pressure release conduit 68 extends from the discharge conduit 58.2 to the second chamber space 60. The first pressure release conduit 68 is provided with a control valve 72, which is arranged operable under command of the secondary control unit 18. The first pressure release conduit has an end 70 which is arranged to open in the space 60 at an operational region of the guide part 56. The guide part 56 has a control edge at the location of the end 66 of the second pressure release conduit 64 such that the position of the guide part 56 control the closing of the conduit 64 into the space 60.

The body part 51 is provided with a second pressure release conduit 64 extending from the discharge conduit 58.2 to the second chamber space 60 i.e. it is parallel to the first pressure release conduit 68. The second pressure release conduit 64 as such, is constantly open but it has an end 66 which is arranged to open in the space 60 at an operational region of the guide part 56. The guide part 56 has a control edge at the location of the end 66 of the second pressure release conduit 64 such that the position of the guide part 56 control the opening and closing of the conduit 64 into the space 60. The end 70 of the first pressure release conduit 68 is arranged closer the partition wall 54 than the end 66 of the second pressure release conduit 64. This way the end 70 of the first pressure release conduit 68 is opened before the end 66 of the second pressure release conduit 64, when the guide part 56 is moving towards the partition wall 54.

The control valve 72 in the first pressure release conduit 68 is controlled by the secondary control unit 18 independently from the primary control procedure which controls the inlet valve during the normal operation. The cam profile 5 contains sublevel portions below its circular base line 5' by means of which the guide part 56 is moved to a position past (or below in the figure) the ends 70, 66 of the pressure relief conduits at a predetermined crank angle range of the engine. This way the configuration of pressure relief conduits and the guide part 56 constitute a mechanical valve closing system.

What comes to the operation of the first pressure relief conduit 68, the cam profile comprises a first sublevel portion 5.1 which, when being against the roller 58 allows the guide part 56 to move past the end 70 of the first pressure relief conduit 68. Now, depending on the state of the control valve 72, the medium pressure in the first chamber space 59 is either relieved or maintained. In this embodiment the control valve 72 is opened and maintained constantly open by the secondary control unit 18 when load related parameter is e.g. within a pre-set range. When the control valve 72 is opened, the movement of the guide part 56 past the end 70 causes the opening of flow communication between the first chamber space 59 and the second chamber space 60 relieving the pressure from the first chamber space 59. Thus a forced closing of the inlet valve at certain crank angle independently on the operation of e.g. the main valve means 61 in the discharge conduit 58.2 is taken place.

This way the operation includes a secondary control procedure controlled by the secondary control unit 18 by means of which the inlet valve 20 of the inlet valve system 10 is controlled to be closed in response to at least one parameter relating to engine load conditions independently from and with higher priority than the primary control procedure controlled by the primary control unit 16.

As an example, when an engine with two stage turbocharger is operated at nominal certain load, during which the charge pressure is more than 5 bars, the inlet valve is controlled to be closed early before the bottom dead center of the respective piston, say for example at 75 degrees before bottom dead center angle, i.e. 105 degrees after top dead center. A suitable range for the first range relating to the primary control procedure is 70-100 before bottom dead center. Now the primary control procedure takes care of appropriate inlet valve closing timing. In order to safeguard the engine the secondary control procedure is applied parallel to the primary control procedure. According the secondary control procedure, the secondary control unit 18 controls the valve 72 to be constantly open while the engine is operated at the nominal load. This means that during each cycle of the piston the opening of flow communication between the first chamber space 59 and the second chamber space 60 ensures that even if the primary control unit or procedure somehow should fail the movement of the guide part 56 past the end 70 causes the inlet valve to close in any case at an crank angle which still does not allow the compression pressure to rise to too high level. The crank angle may be for example 55 degree before bottom dead center.

The cam profile 5 comprises a second sublevel portion 5.2 which, when being against the roller 58 allows the guide part 56 to move past the end 66 of the second pressure relief conduit 64. Now, the medium pressure in the first chamber space 59 is relieved to the second chamber space 60, from which the medium may be discharged substantially freely. The second sublevel portion 5.2 together with the second pressure relief conduit 64 ensures mechanically the eventually the inlet valve is closed regardless of any disturbances in primary control procedure.

The first pressure release conduit 68 is here arranged in the body part 51, but it may also be at least partially external to the body part. For example the valve 72 may be arranged outside the body part.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A method of controlling an operation of an inlet valve system arranged in connection with each cylinder of an internal combustion piston engine, which method comprises during the operation of the engine steps of
   1) Monitoring at least one parameter relating to engine load conditions,
   2) Controlling, using a primary control procedure, a closing timing of an inlet valve of the inlet valve system in response to the at least one parameter obtained in the step 1), before a bottom dead center, wherein the primary control procedure closes the inlet valve within a first range between a first crank angle value and a second crank angle value before the bottom dead center, and
   3) Feeding charge air into the said cylinder via the inlet valve of the inlet valve system when the inlet valve is open,
and by using a secondary control procedure the closing timing of the inlet valve of the inlet valve system is controlled in response to at least one parameter relating to the engine load conditions independently from and with higher priority than by using the primary control procedure, which secondary procedure closes the inlet valve within a second range between a third crank angle and a fourth crank angle in respect to the bottom dead center, which third crank angle is outside the first range, and the third crank angle is closer to the bottom dead center than the first range.

2. A method of controlling an operation of an inlet valve system according to claim 1, wherein in the secondary control procedure the at least one parameter is a measured pressure of the charge air.

3. A method of controlling an operation of an inlet valve system according to claim 1 wherein the secondary control procedure is practiced parallel with and independently on the primary control procedure, which secondary procedure closes the inlet valve at a third crank angle in respect to the bottom dead center, which third crank angle is equal to or less than the second crank angle value.

4. A method of controlling an operation of an inlet valve system according to claim 3, wherein the first range is 70-100 degrees before the bottom dead center.

5. A method of controlling an operation of an inlet valve system according to claim 3, wherein the first range is 70-100 degrees before the bottom dead center, and the second range is 55-70 degrees before the bottom dead center.

6. A method of controlling an operation of an inlet valve system according to claim 1, wherein the at least one parameter for the primary control procedure and the at least one parameter for the secondary control procedure are acquired independently from each other.

7. A method of controlling an operation of an inlet valve system according to claim 1, wherein the at least one parameter for the primary control procedure and the at least one parameter for the secondary control procedure are different parameters.

8. A method of controlling an operation of an inlet valve system according to claim 1, wherein the at least one parameter for the primary control procedure and for the secondary control procedure is the same parameter.

9. A method of controlling an operation of an inlet valve system according to claim 1, wherein charge air is fed to the engine pressurized in two super-charging stages.

10. A method of controlling an operation of an inlet valve system according to claim 1, wherein the charge air fed into the cylinder at a pressure higher than 5 bar.

11. A method of controlling an operation of an inlet valve system according to claim 1, wherein the secondary control procedure closes the inlet valve at latest at a crank angle which result in compression pressure lower than a predetermined maximum compression pressure prior to ignition.

12. A method of controlling an operation of an inlet valve system according to claim 1, wherein the primary control procedure and secondary control procedure are used for control a common mechanical actuator.

13. A method of controlling an operation of an inlet valve system according to claim 1, wherein the primary control procedure and secondary control procedure are used for control a mechanical actuator dedicated to the each of the primary control procedure and secondary control procedure.

14. A method of controlling an operation of an inlet valve system according to claim 1, wherein the first range is 70-100 degrees before the bottom dead center, and the second range is 55-70 degrees before the bottom dead center.

15. An inlet valve control system for use in connection with a cylinder-of an internal combustion piston engine, the inlet valve control system-comprising:

a monitoring unit arranged to monitor at least one parameter relating to engine load conditions, a primary control unit arranged to control closing timing of an inlet valve of the inlet valve system in response to at least one parameter relating to the engine load conditions, wherein the inlet valve control system comprises a secondary control unit arranged to control the closing timing of the inlet valve in response to at least one parameter relating to the engine load conditions independently from and with higher priority than the primary control unit, and wherein the primary control unit is arranged to close the inlet valve within a first range between a first crank angle value and a second crank value in respect to the bottom dead center, and the secondary control unit is arranged to close the inlet valve within a second range between a third crank angle and a fourth crank angle before a bottom dead center, wherein the third crank angle is outside the first range, and the third crank angle is closer to the bottom dead center than the first range.

16. An inlet valve control system according to claim 15, wherein the secondary control unit is arranged to control the closing timing of the inlet valve in response to measured pressure and/or temperature of the charge air.

17. An inlet valve control system according to claim 15, wherein the primary control unit is arranged to close the inlet valve-within a range of 70-100 degrees before the bottom dead center.

18. An inlet valve control system according to claim 15, wherein the primary control unit is arranged to close the inlet valve-within a range of 70-100 degrees before the bottom dead center and the secondary control unit is arranged to close the inlet valve arranged to close the inlet valve within a range of 55-70 degrees before the bottom dead center.

19. An inlet valve control system according to claim 15 wherein the secondary control unit is arranged to control the closing timing of the inlet valve by actuating a mechanical valve closing system.

20. An inlet valve control system according to claim 15 wherein the primary control unit is provided with computer executable instructions to control closing timing of an inlet valve of the inlet valve system in response to at least one parameter relating to engine load conditions, and the secondary control unit is provided with computer executable instructions to close the inlet valve in response to at least one parameter relating to the engine load conditions independently from and with higher priority than the primary control unit.

21. An inlet valve control system according to claim 15, wherein the primary control unit and the secondary control unit are arranged to control a mechanical actuator dedicated to each of the control units.

22. An inlet valve control system according to claim 15, wherein the primary control unit and the secondary control unit are arranged to control a common mechanical actuator.

* * * * *